United States Patent [19]

DeVita et al.

[11] 4,325,118
[45] Apr. 13, 1982

[54] INSTRUCTION FETCH CIRCUITRY FOR COMPUTERS

[75] Inventors: Joseph DeVita, Laguna Hills; Brian Pirzadeh, Costa Mesa, both of Calif.

[73] Assignee: Western Digital Corporation, Irvine, Calif.

[21] Appl. No.: 126,313

[22] Filed: Mar. 3, 1980

[51] Int. Cl.³ .............................. G06F 7/00; G06F 9/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,228,005 | 1/1966 | Delmege et al. | 364/200 |
| 3,978,456 | 8/1976 | Moran | 364/200 |
| 4,099,229 | 7/1978 | Kancler | 364/200 |
| 4,109,310 | 8/1978 | England et al. | 364/200 |
| 4,236,206 | 11/1980 | Strecker et al. | 364/200 |

FOREIGN PATENT DOCUMENTS 1130270 10/1968 United Kingdom .
1279837 6/1972 United Kingdom .
1570510 2/1980 United Kingdom .

Primary Examiner—Gareth D. Shaw
Assistant Examiner—Eddie P. Chan
Attorney, Agent, or Firm—Spensley, Horn, Jubas & Lubitz

[57] ABSTRACT

The invention is used in a computer system to buffer the transfer of program portions from a system having a first bus width to instruction processing logic having a second bus width. An instruction register receives program portions via a system bus from the program memory. A state register stores a code specifying the action to be taken to transfer the next program portion from the instruction register to the instruction processing logic. Control logic, upon receiving a request for the next program portion from the instruction processing logic, inspects the state register to determine whether the next program portion in sequence should be retrieved from the memory and stored in the instruction register. In addition, the control logic transfers the appropriate program portion to the instruction processing logic, and updates the state register code in preparation for the next request from the instruction processing logic.

14 Claims, 7 Drawing Figures

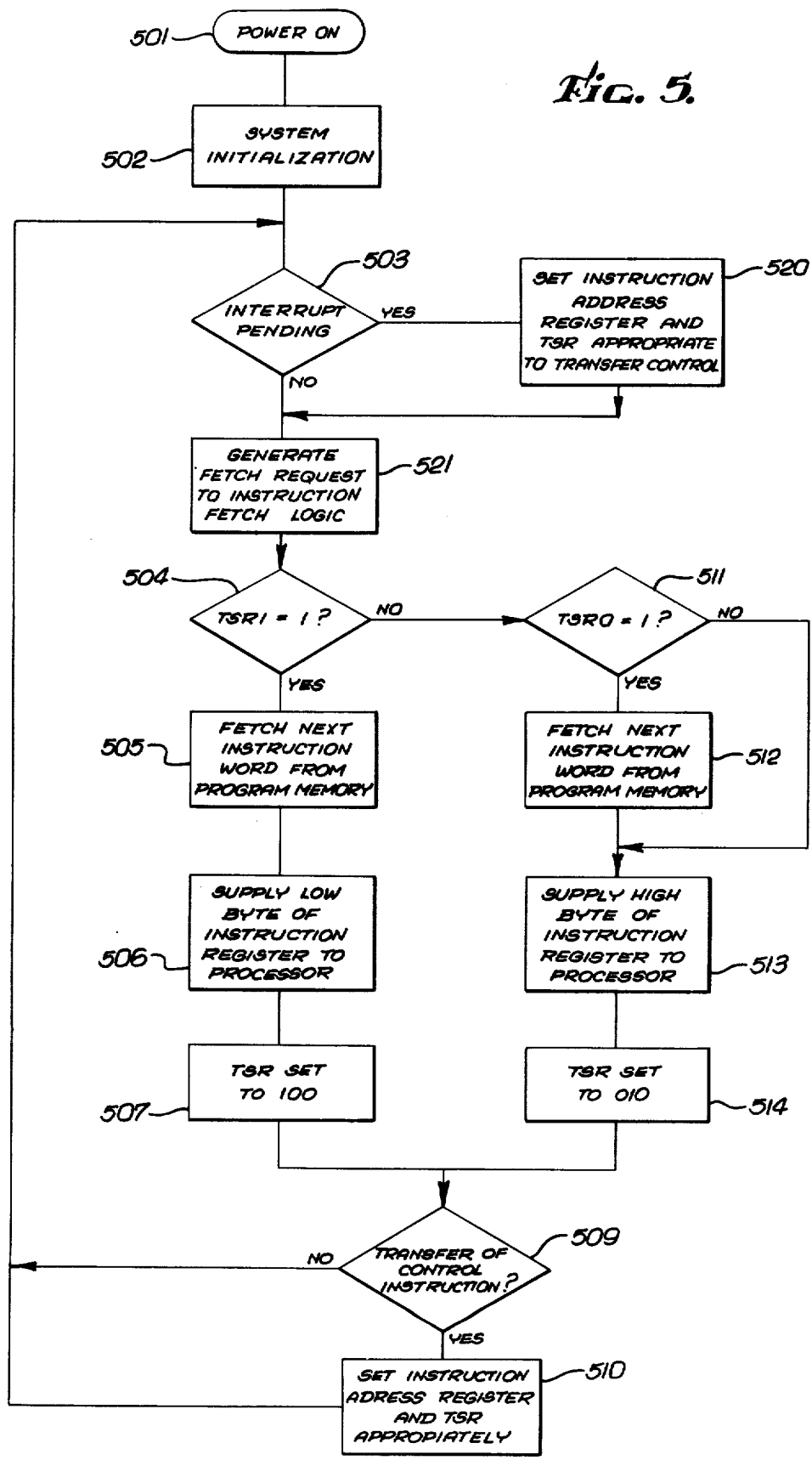

INSTRUCTION FETCH CIRCUITRY FOR COMPUTERS

BACKGROUND OF THE INVENTION

1. Field of the Invention

The invention relates to circuitry buffering the transfer of computer program instructions from a memory to an instruction processor and, in particular, to circuitry which decouples the memory controller bus width from the instruction processor bus width.

2. Description of the Prior Art

The semiconductor industry has enjoyed enormous technological advances recently. One of the most spectacular developments in the semiconductor industry has been the mass production of highly sophisticated microprocessor devices. These microprocessors perform substantially all functions which are performed by central processing units of much larger computers. A microprocessor may be combined with a few other integrated circuit devices to form a powerful yet inexpensive microcomputer system rivalling in capability large and expensive computer systems manufactured only a few years ago.

Early microprocessors were limited in the amount of information which could be simultaneously transferred in parallel to or from them. For instance, the address and data bus widths were usually limited to allow only 8 bits (i.e. 1 byte) to be transferred simultaneously between the microprocessor and other elements of the microcomputer system. This bus width restriction was a major limitation on the capabilities of the microprocessors. At the time the first microprocessors were put on the market a typical large computer system would have a central processing unit with bus widths typically in the range two to eight bytes.

In order to supply a powerful and sophisticated instruction set, the microprocessor designers developed instruction sets which included instruction of several lengths, i.e., one to three bytes. Multibyte instructions require the appropriate number of bytes to be fetched in sequence from the program memory. Substantial time is consumed in sequentially fetching the bytes forming a single instruction, limiting instruction execution rate. Single byte instruction, requiring only a single fetch from the program memory, could be executed in a much shorter period of time. In order to speed the execution of instructions, a microprocessor's instruction set would be designed to assure that the one byte instructions performed as many as possible of the most frequently desired processing functions. Less frequently used processing functions would then be allocated to the longer length instructions.

Such instruction set designs optimized the microprocessor system architecture, and compensated for the limited bus widths of the devices. As a result, the processing capability of microcomputer systems began to approach those of larger computer systems having substantially larger bus widths.

Due to the popularity of microprocessors, a vast amount of software has been written for them. A substantial investment of time and money has been made by numerous companies in software for particular microprocessors. Users of one byte bus width microprocessors wish to maintain software compatibility between these early generations of microprocessors and later generations. Due to advances in semiconductor technology, there are commercially available microprocessors having bus widths of two bytes. It is expected that in the near future there will be microprocessors having bus widths of four bytes in length. Nevertheless, these improved microprocessors will meet resistance in the marketplace unless they can execute software orginally designed to run on the one byte bus width microprocessors.

For example, the Pascal computer language was developed in the 1970's for use primarily with microprocessors. Pascal is a high-level language, which is typically compiled into "P-Code". The definition of Pascal and its P-Code has been more or less standardized. This allows a Pascal program to be executed on any computer which can execute P-Code or has a program to interpret it. P-Code contains instructions of one to four bytes in length. When a computer processor is executing P-Code, whether interpretively or directly, it must process it a byte at a time. If the computer system has a bus width allowing more than one byte at a time to be transferred between the program memory and processor, there is a difficulty in "parsing" the multiple bytes transferred simultaneously into the byte units which form P-Code instructions.

It is not desirable to transfer several bytes in parallel to the processor and have it discard all but the single byte of P-Code it desires. If this were done, the advantage of a wider bus width, namely that fewer time consuming memory accesses are required, would be nullified.

Accordingly, it is an object of the invention to provide digital logic which interfaces between a processor having an instruction set with instructions of multiples of a first size and a computer system having a system bus permitting program instruction transfers of a second size. It is another object of the invention to provide instruction fetch logic which buffers instructions fetched from program memory, providing them as requested by the processor. Yet another object of the invention is to provide a computer system in which the possible instruction lengths are independent of the bus width between the processor and remaining parts of the computer system.

SUMMARY OF THE INVENTION

These and other objects of the invention are provided by the herein disclosed digital logic. An instruction register has certain selected positions of it loaded from data transferred from the program memory. Control circuitry determines which locations in the instruction register should be loaded by each portion of the program fetched from the program memory. The control circuitry also controllably transfers the contents of other selected portions of the instruction register to a processor when it so requests.

In order to maintain the current address in the memory of the portion of the program being fetched, an instruction address register is provided. This register contains the address in the program memory for the current portion of the program which was last fetched. The control circuitry increments this register when necessary to request the next portion of the program from the program memory. The control circuit maintains a translation state register. This register indicates which portions of the data in the instruction register should next be transferred to the processor, and whether additional program data should be fetched from the memory to be placed in the instruction register.

BRIEF DESCRIPTION OF THE DRAWINGS

FIG. 5 is a flowchart diagram illustrating the operation of the circuitry of FIG. 4 in the context of a microcomputer system such as that illustrated in FIG. 1.

DETAILED DESCRIPTION OF THE PREFERRED EMBODIMENTS

Figure 1:
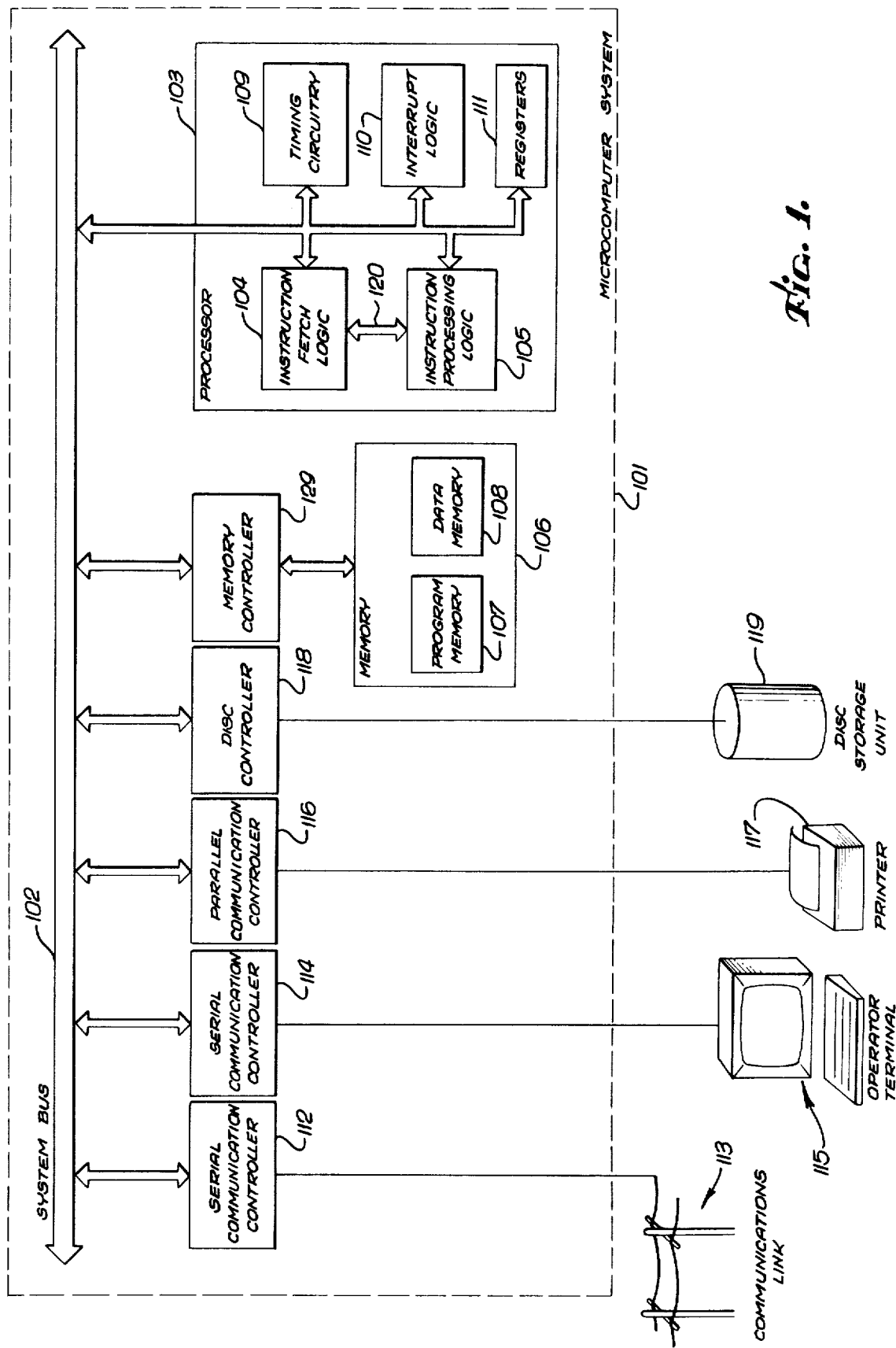
FIG. 1 is a block diagram of a typical microcomputer system using an embodiment of the invention.

FIG. 1 is a diagrammatic representation of a typical microcomputer system using the teachings of the invention, such as the Pascal Microengine, a trademarked name for a processor manufactured by Western Digital Corporation, Newport Beach, Calif., which executes Pascal P-code. The microcomputer system 101 has a system bus 102 which transfers data between its various circuit modules. The system bus 102 allows the simultaneous parallel transfer of information. The processor 103 includes instruction processing logic 105 and the inventive instruction fetch logic 104. The instruction processing logic 105 performs the operations necessary to execute the instructions of the particular computer program in execution.

The inventive instruction fetch logic 104 may be used with a system bus that transfers any arbitrary number, say m, bits of data in parallel and with instruction processing logic 105 which requests any arbitrary number, say n, bits of program data to be transferred to it when it requests the next portion of the program data. In the preferred embodiment, the system bus 102 transfers 16 bits, i.e. two bytes, in parallel and the instruction processing logic 105 requests 8 bits (one byte) portions of program data. The instruction fetch logic 104 buffers the flow of program data from the program memory 107 through the system bus, having width two bytes, to the instruction processing logic 105, which has a width of only one byte.

The P-Code instructions to be executed are stored in memory 106. The memory 106 may be conceptually divided into program memory 107 and data memory 108, although the memory 106 should not be considered to be physically separable into program 107 and data 108 memory. The memory 106 is interfaced to the system bus 102 via a memory controller 129. The memory controller 129 receives address signals specifying which particular two bytes in the memory 106 is being addressed through bus 102. Other control signals passed along bus 102 specify whether the addressed bytes are to be fetched or modified.

The instruction fetch logic 104 maintains the address for the next m-bit portion of the program in the program memory 107 to be processed by the instruction processing logic 105. It passes the appropriate address via the system bus 102 to the memory controller 129. The appropriate portion of program data is retrieved from the program memory 107 by the memory controller 129 and forwarded via the bus 102 to the instruction fetch logic 104. The instruction fetch logic 104 then provides the instruction processing logic 105 with the appropriate n-bit portion of the program being executed.

In addition to the instruction fetch logic 104 and instruction processing logic 105, the illustrative processor 103 of FIG. 1 also includes timing circuitry 109, interrupt logic 110, and various software accessable registers 111. Timing circuitry 109 generates multiphase clock signals for use to coordinate the activities of the microcomputer system 101. Interrupt logic 110 permits interruption by an external event of the program being executed by the instruction processing logic 105. Interrupt logic 110 receives notification of the occurrence of such external events via the system bus 102 from various peripheral controllers 112-118.

The exemplary microcomputer system 101 includes two serial communications controllers 112, 114. These controllers 112, 114 convert data they receive in parallel format from the system bus 102 to a serial format for forwarding to external devices, such as a communications link 113 or operator terminal 115. The serial communication controllers 112, 114 also reformat data serially received from these external devices 113, 115 to parallel format suitable for transmission via the system bus 102.

The system 101 also includes a parallel communications controller 116. The parallel communications controller 116 reformats selected data which it receives via the system bus 102 to an appropriate parallel transmission format for forwarding to a printer 117, or other such device having a parallel interface.

Disc controller 118 allows connection of a disc storage unit 119 to the system 101. This storage unit 119 provides direct access to a large amount of data.

The system bus 102 of the previously mentioned Pascal Microengine ™ provides an ability to transfer two bytes of data simultaneously between the various modules connected to it. The width of the system bus, i.e., two bytes, offers considerable improvements in speed over a computer system having a system bus of one byte in width. Nevertheless, the instruction processing logic 105 requests only a single byte of P-Code program at a time from the instruction fetch logic 104. The bus 120 between the instruction processing logic 105 and the instruction fetch logic 104 is one byte in width.

Figure 2:
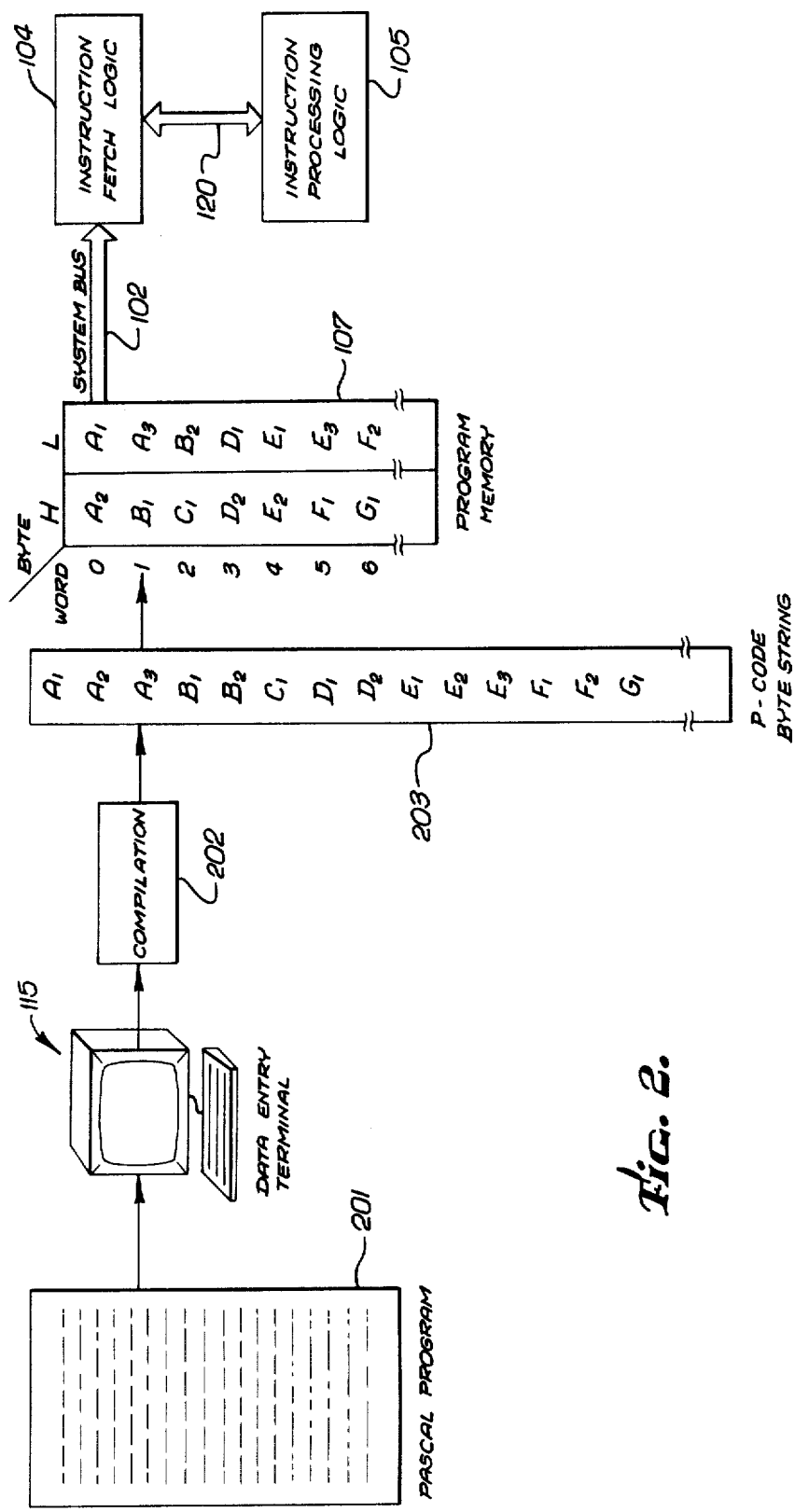
FIG. 2 is a diagrammatic representation of the processing steps performed by a Pascal microcomputer system to process a program.

FIG. 2 illustrates the flow of information from a computer programmer's statement of a Pascal program to its processing by the instruction processing logic 105. For illustrative purposes only, the diagrammatic representation in FIG. 2 of the processing steps performed by a microcomputer system 101 to execute a program assumes that the system 101 compiles programs written in Pascal into P-Code and directly executes the generated P-Code. Of course, the teachings of the invention are much broader than for use with merely such a computer system, and the scope of the invention should not be so limited.

First, a programmer generates a Pascal program 201. Once generated, it is entered via the data terminal 115 into the microcomputer system 101. Pascal is a high level language, i.e., it is not directly executed by a computer, but must be translated to P-Code, the standardized lower level instruction set into which Pascal programs are converted. This translation process from the Pascal program 201 to P-Code is performed by a previously written compiler program. The compilation 202 of the Pascal program 201 results in a byte string 203 of P-Code instructions.

FIG. 2 indicates that a portion of the Pascal program 201 has been decomposed into instructions A through G. Instruction A is a three byte P-Code instruction, each byte designated by an appropriate subscript. Similarly, instruction B is two bytes long, and instruction C is one byte long.

After the compiler has formed this P-Code byte string 203, it is stored in the program memory 107. For purposes of definition, the unit of addressable storage of the program memory 107 will be a word of two bytes: the high order byte (H) and the low order byte (L). As indicated in FIG. 2, $A_1$ is stored in word 0, low byte. Additional bytes of the P-Code byte string 203 are organized into two byte words and stored in consecutive locations of the program memory 107.

When the program is being executed, the instruction fetch logic 104 requests via the system bus 102 the contents of the particular word of the program memory 107 which contains the next byte of the P-Code byte string 203 to be executed. The memory controller 129 transfers, via system bus 102, the addressed word to the instruction fetch logic 104. The instruction fetch logic 104 then provides, via bus 120, the next byte to be executed to the instruction processing logic 105. As mentioned earlier, whereas in this embodiment the system bus 102 transfers two bytes in parallel, the bus 120 from the instruction fetch logic 104 to the processor control logic 105 transfers only a single byte in parallel.

Figure 3A:
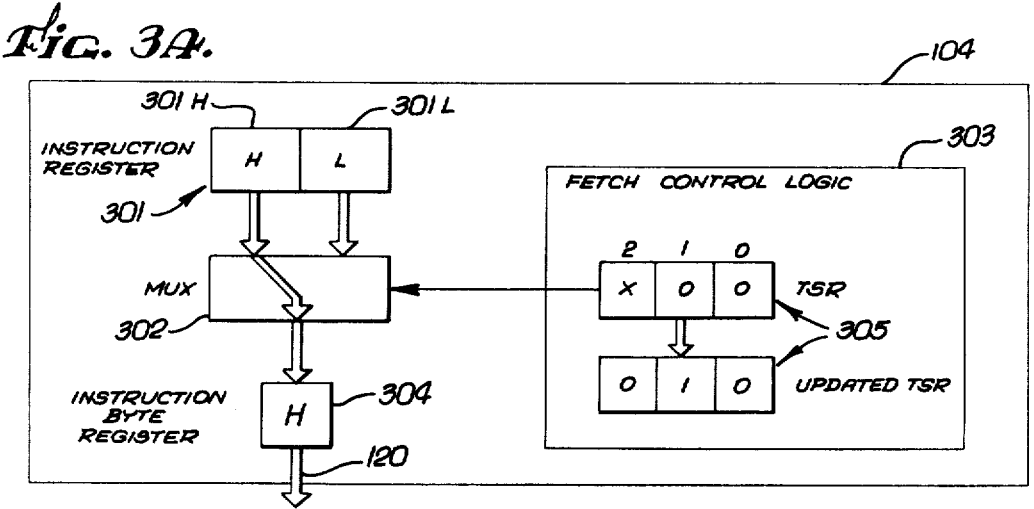
FIGS. 3A–C diagrammatically illustrate the transfer of consecutive portions of a program from the program memory to an instruction processor.
Figure 3B:
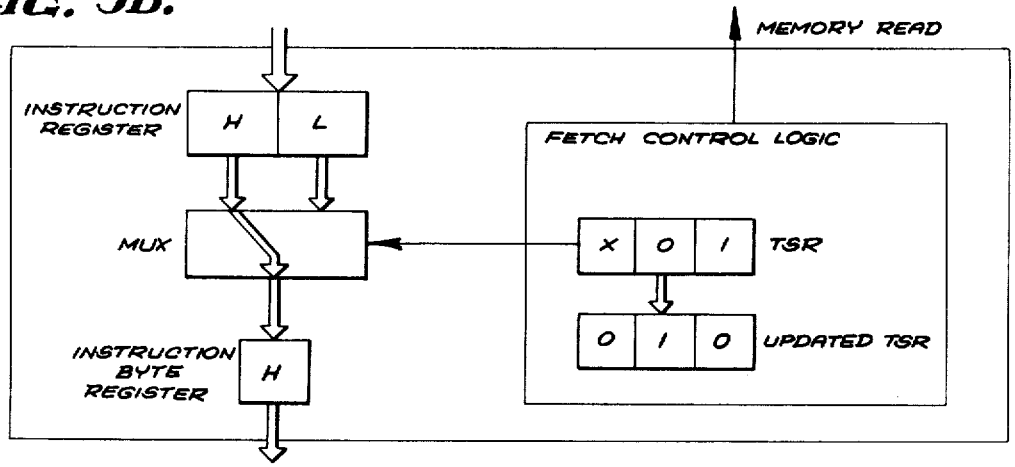
Figure 3C:
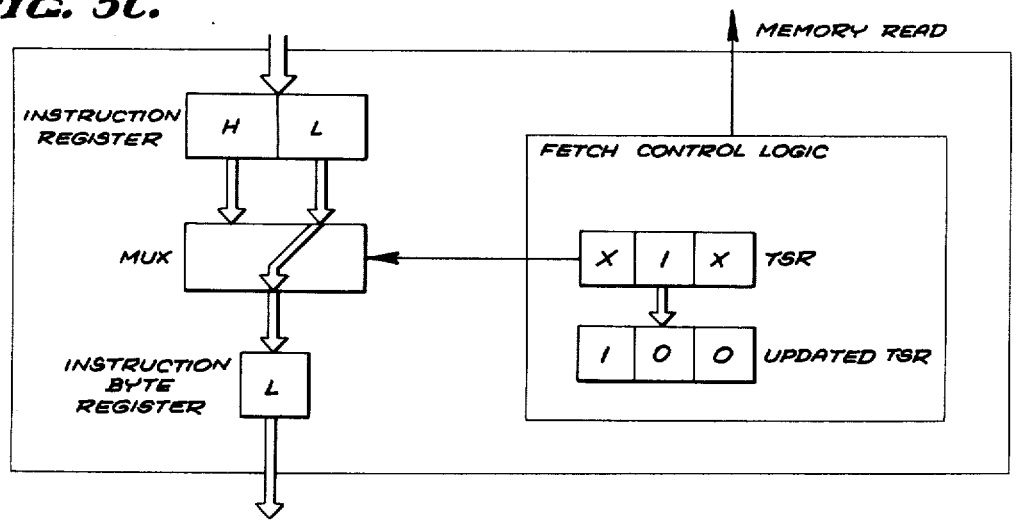

FIGS. 3A–C diagrammatically illustrate the flow of portions of program instructions through the instruction fetch logic 104 of a preferred embodiment in which the system bus has width sixteen bits, and the instruction processing logic 105 has bus width eight bits. An instruction register 301 stores a word of the program being executed. This register 301 is partitioned into a high byte subregister 301H and a low byte subregister 301L. The instruction register 301 is coupled to a multiplexer 302 ("mux"). Fetch control logic 303 specifies to the mux 302 whether the high byte or low byte of the instruction register 301 should be transferred to an instruction byte register 304. The instruction byte register 304 is coupled to the processor control logic 105 via bus 120, and provides a single byte at a time of the program to it. The fetch control logic 303 includes a translation state register 305 ("TSR"). The TSR 305 stores status flags used by the fetch control logic 303 to control the mux 302. In the preferred embodiment, the translation state register 305 stores three bits of data, designated as TSR0, TSR1 and TSR2.

fetch logic 104 to the instruction processing logic 105. The fetch control logic 303 resets the values in the TSR 305 after each byte of program is transfered to the instruction processing logic. In FIGS. 3A–C, the new values stored in the TSR 305 after a byte has been transferred to the instruction processing logic 105 by the fetch control logic 305 are indicated below the initial values assigned. In FIGS. 3A–C, a "0" in a storage position of the TSR 305 indicates that a zero bit should be present there, a "1" indicates a one bit should be present, and a "X" indicates that either a zero or one bit may be present.

In FIG. 3A, the TSR 305 initially contains the value "X00". Such a value indicates that the instruction register 301 contains a portion of the program which should next be provided to the instruction processing logic 105. Specifically, the high byte, found in the instruction subregister 301H, should be provided to the instruction processing logic 105 when a fetch signal requesting the next byte is received from it. Accordingly, upon receiving the fetch request the fetch control logic 303 controls the mux 302 to transfer the contents of the high byte of the instruction register 301 to the instruction byte register 304, where it is available to the instruction processing logic 105. After this has been done, the fetch control logic 303 updates the flags in the TSR 305 to the values "010".

In FIG. 3B, the TSR 305 has the value "X01". This value indicate to the fetch control logic 303, that the instruction register 301 does not contain portions of the program which should be transferred to the instruction processing logic 105. Accordingly, a memory read operation is initiated by the fetch control logic 303 to cause the transfer of a word of the program from the program memory 107 to the instruction register 301. In addition, these TSR values indicate that after the instruction register 301 has been updated with the next word of the program data, the high byte of it should be transferred to the instruction byte register 304. Fetch control logic 303 provides the appropriate control signal to the mux 302 to cause this transfer. The fetch control logic 303 then sets the values in the translation state register 305 to "010".

In FIG. 3C, the translation state register has the value "X1X". This value indicates to the fetch control logic 303 that the instruction register 301 does not contain the portion of the program which should next be provided the instruction processing control logic 105. Accordingly, the fetch control logic 303 initiates a memory read operation, causing the transfer of a word of the program from the program memory 107 to the instruction register 301.

TABLE A

| PROCESSOR FETCH NO. | TSR CONTENTS | FETCH INSTRUCTION WORD | INSTRUCTION WORD ADDRESS | INSTRUCTION REGISTER CONTENTS | HIGH OR LOW BYTE | INSTRUCTION BYTE REGISTER CONTENTS |
|---|---|---|---|---|---|---|
| 1 | X10 | YES | 0 | $A_2A_1$ | LOW | $A_1$ |
| 2 | 100 | NO | 0 | $A_2A_1$ | HIGH | $A_2$ |
| 3 | 010 | YES | 1 | $B_1A_3$ | LOW | $A_3$ |
| 4 | 100 | NO | 1 | $B_1A_3$ | HIGH | $B_1$ |
| 5 | 010 | YES | 2 | $C_1B_2$ | LOW | $B_2$ |
| 6 | 101 | YES | 5 | $F_1E_3$ | HIGH | $F_1$ |
| 7 | 010 | YES | 6 | $G_1F_2$ | LOW | $F_2$ |

FIGS. 3A–C indicates the effect that specific values stored in the TSR 305 of the preferred embodiment will have in controlling the transfer of program instruction from the program memory 107 through the instruction After this has been performed, the fetch control logic 303 provides a control signal to the mux 302, causing the transfer of the value in the low byte subregister 301L to the instruction byte register 304. After this transfer has been performed, the fetch control logic 303 reassigns the values in the translation state register 305 to "100".

TABLE A illustrates the major logic decisions and register values of the instruction fetch logic 104 of FIG. 3 during the transfer of the P-Code byte string 203 of FIG. 2. Each row in TABLE A corresponds to a single fetch request by the instruction processing logic 105. For illustrative purposes it is assumed that the two byte instruction B, stored in words 1 and 2 of the program memory 107, is a transfer of control instruction which causes execution of the program to be continued at the two byte instruction F, stored in words 5 and 6 of the program memory 107.

The TSR 305 is assumed to have been initialized by other portions of the microcomputer system 101 to "X10". The first fetch request generated by the instruction processing logic 105 causes the fetch control logic 303 to inspect the TSR 305. As is indicated in FIG. 3C, a word from the program memory 107 is transferred to the instruction register 301. It is assumed that word 0 of the program memory 107 contains the next two bytes of the P-Code byte string 203 to be executed. Accordingly, the instruction register contents will be set to $A_2A_1$. Further, as indicated in FIG. 3C, the low byte, namely $A_1$, is transferred to the instruction byte register 304, where it is available to the instruction processing logic 105 for execution. The TSR 305 is then set to "100".

Upon receiving the second fetch request from the instruction processing logic 105, the high byte, namely $A_2$, of the instruction register 301 is transferred to the instruction byte register 304. The TSR 305 is then set to "010".

Similarly, the third and fourth fetch requests by the instruction processing logic 105 cause the transfer of the contents of word 1 of the program memory 107 to the instruction processing logic 105 one byte at a time. The fifth fetch request by the instruction processing logic 105 causes word two of the program memory 107 to be transferred to the instruction register 301. The low byte, containing $B_2$, of the instruction register 301 is transferred to the instruction byte register 304 for processing by the instruction processing logic 105.

As previously mentioned, it is assumed that instruction B causes a transfer of control to instruction F, which is stored in word 5 of the program memory 107. The instruction processing logic 105 executes a transfer of control instruction by appropriately setting the TSR 305 and instruction word address to cause the continuation of the program execution at the desired place in the P-Code byte string 203. As shown in Row 6, the instruction processing logic 105 causes the transfer of control by setting the instruction word address to 5 and the TSR 305 to "101". As indicated in FIG. 3B, such value for the TSR 305 causes the fetch control logic 303 to request a word to be read from the program memory 107. Accordingly, word 5, having value $F_1E_3$, is stored in the instruction register 301. Further, the contents of the high byte 301H of the instruction register 301 is then transferred to the instruction byte register 304. It should be noted that contents of the low byte of the instruction register 301 are not transferred to the instruction byte register 304, since the transfer of control instruction specified that program execution should continue at a P-Code byte which was stored in the high byte of a word in the program memory 107. When the P-Code byte string 203 is stored in the program memory 107, the ability to address any of the P-Code bytes requires that in some instances the P-Code byte being transferred to will be in the high byte of a word in the program memory 107.

In this case, as indicated in FIG. 3B and in the sixth row of TABLE A, only one of the two bytes transferred to the instruction register 301 will be used.

The processing of seventh fetch request by the instruction processing logic 105 is similar to the first, third, and fifth fetch request.

Figure 4:
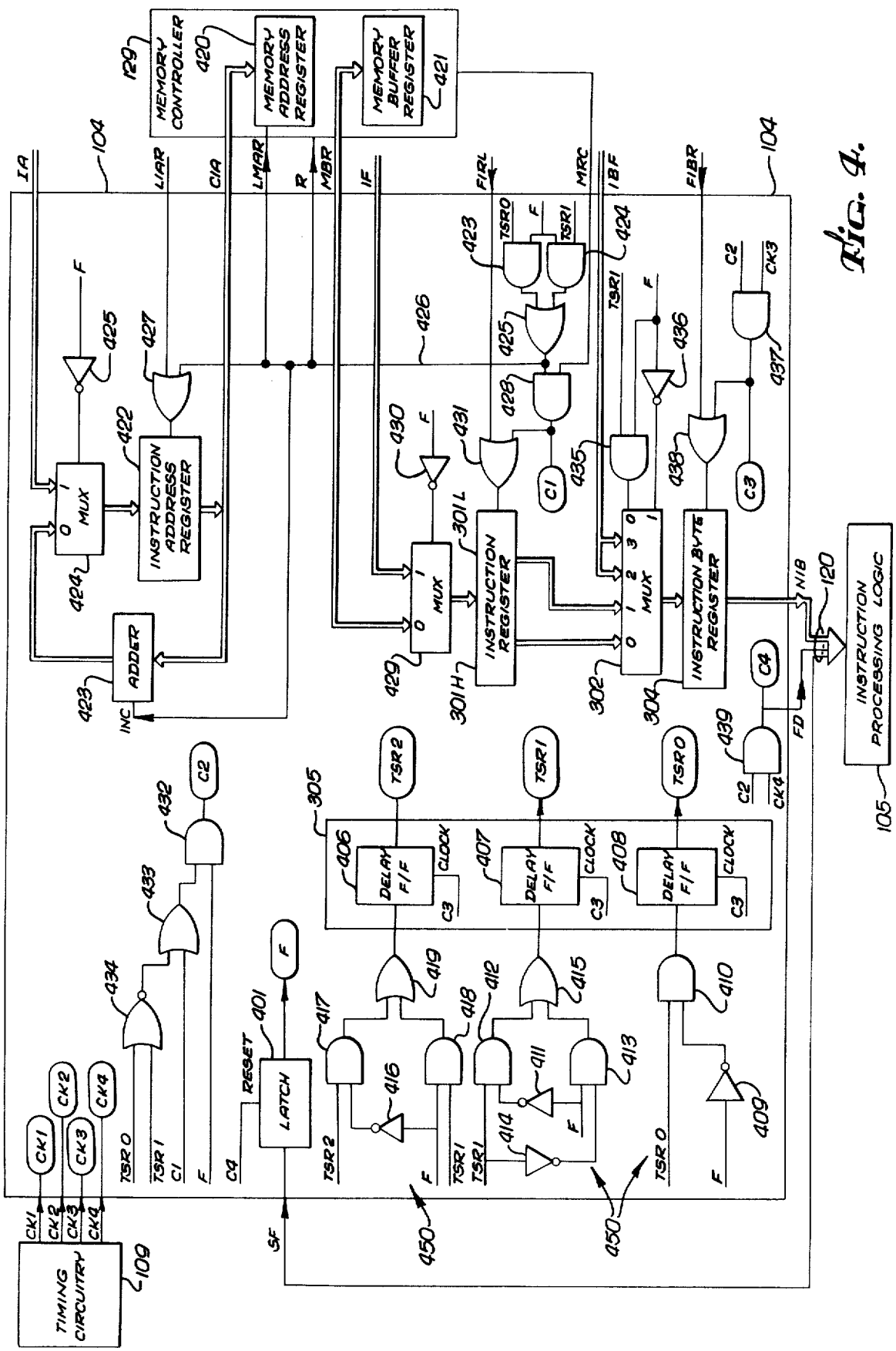
FIG. 4 is an electronic schematic of a preferred embodiment of the invention where the bus width to the memory is two bytes and the bus width to the instruction processor is one byte.

FIG. 4 is a electronic schematic for a preferred embodiment of the inventive instruction fetch logic 104. TABLE B lists the signal line mnemonics used in the

TABLE B

| NMEMONIC | FUNCTION | GENERATION |
|---|---|---|
| CK1 | Phase 1 of timing | Timing Circuitry |
| CK2 | Phase 2 of timing | Timing Circuitry |
| CK3 | Phase 3 of timing | Timing Circuitry |
| CK4 | Phase 4 of timing | Timing Circuitry |
| SF | Start Fetch | Instruction Processing Logic |
| IA | Instruction Address | Instruction Processing Logic |
| LIAR | Load Instruction Address Register | Instruction Processing Logic |
| CIA | Current Instruction Address | Instruction Fetch Logic |
| LMAR | Load Memory Address Register | Instruction Fetch Logic |
| R | Perform Read From Program Memory | Instruction Fetch Logic |
| MBR | Memory Buffer Register | Memory Controller |
| IF | Instruction - Forced | Instruction Processing Logic |
| FIRL | Force Instruction Register Load | Instruction Processing Logic |
| IBF | Instruction Byte - Forced | Instruction Processing Logic |
| MRC | Memory Read Complete | Memory Controller |
| FIBR | Force Instruction Byte Register Load | Instruction Processing Logic |
| NIB | Next Instruction Byte | Instruction Fetch Logic |
| FD | Fetch Done | Instruction Fetch Logic |
| TSR0 | Translation State Register - Bit 0 | Instruction Fetch Logic |
| TSR1 | Translation State Register - Bit 1 | Instruction Fetch Logic |
| TSR2 | Translation State Register - Bit 2 | Instruction Fetch Logic |
| F | Fetch Done | Instruction Fetch Logic |
| C1 | Memory read requested and completed | Instruction Fetch Logic |
| C2 | Instruction register contains next instruction byte. | Instruction Fetch Logic |
| C3 | | Instruction Fetch Logic |
| C4 | | Instruction Fetch Logic | schematic of FIG. 4. The embodiment of FIG. 4 is for use in a microcomputer system 101 in which the system bus 102 transfers 16 bits in parallel and the instruction processing logic 105 requests 8 bits of program data at a time.

Timing circuitry 109 generates four-phase clock signals. During the first phase, signal CK1 is true, during the second phase CK2 is true, and similarly for CK3 and CK4. For clarity, the portions of the instruction fetch logic 104 comprising the fetch control logic 303 are not indicated, although it would include the various gate and registers shown in FIG. 4, with the exception of registers 301 and 304, and mux 302.

When the instruction processing logic 105 requests the next byte in sequence, it generates a start fetch pulse on the SF signal line. SF is an input to latch 401. The latch is reset by signal line C4, which will be described below. The output of the latch 401 is signal line F. When F is true, it indicates that a fetch of an instruction byte for the instruction processing logic 105 is in progress.

The TSR 305 includes three delay flip-flops 406, 407, 408. A delay flip-flop is a flip-flop which maintains its previous output until the termination of a clock pulse which is strobing in new input. Such a flip-flop is useful when its output is used to determine its next input. Each of the three delay flip-flops 406 . . . 408 is clocked by signal C3, described below. Flip-flop 408 maintains the value of bit 0 of the TSR 305, and provides its value on signal line TSR0. Flip-flops 407 and 406 perform the same function for bits 1 and 2 of the TSR 305.

The effect of the 3 bits of the TSR 305 is functionally described in FIGS. 3A-C. Bit 2 of the TSR 305 takes the value of bit 1 during the previous fetch of an instruction byte. TSR2 is required by other circuitry in the Pascal Microengine TM microcomputer system 101. Bit 1 of the TSR 305 determines whether the high byte 301H (bit 1=0) or low byte 301L (bit 1=1) of the instruction register 301 will be transferred to TSR the instruction byte register 304 for use by the instruction processing logic 105. When bit 1 of the TSR 305 is 1, i.e., true, a memory read operation is performed to transfer a word from the memory 107 to the instruction register 301.

When bit 1 of the TSR 305 is 0, bit 0 of the TSR register 305 determines whether a word should be transferred from the program memory 107 to the instruction register 301. If bit 0 is 1, the instruction register 301 will be updated from the program memory 107.

As will be described in more detail below, signal line C3, the clock input to the flip-flops of the translation state register 305, will be true only during the final stages of a fetch operation. It is at this time that the translation state register 305 is updated.

The fetch control logic 303 includes state control logic 450 which sets the TSR 305 at the conclusion of each fetch request by the instruction processing logic 105 in preparation for the next fetch request. The state control logic 450 ensures that the TSR 305 contains the appropriate information to determine what portion of the instruction register 304 should next be transferred to the instruction processing logic 105, and whether a read of additional program data from the program memory 107 will be required when the next fetch request is received from the instruction processing logic 105.

In the embodiment of FIG. 4, the state control logic 450 operates as follows. If the instruction processing logic 105 generates a fetch request on signal line SF, signal line F, the output of latch 401, will be true. The output of inverter 409 will be false, causing flip-flop 408 to be set false, i.e., 0. If no fetch was in progress, F will be false, causing the output of inverter 409 to be true. In this event, the current state of TSR0 will be returned to flip-flop 408, through AND gate 410, thereby maintaining the value of bit 0 of the TSR 305.

Inverter 411 and AND gate 412 perform a similar function with bit 1 of the TSR 305. However, if signal line F is true, then the current value of bit 1 of the TSR 305 is inverted by inverter 414, and passed through AND gate 413. OR gate 415 combines the outputs of AND gates 412 and 413 and presents them to flip-flop 407 as the new value for bit 1 of the TSR 305.

Inverter 416 and AND gate 417 maintain the value of bit 2 of the TSR 305 in the event that a instruction byte fetch was not requested by the instruction processing logic 105 i.e., if F is false. Alternatively, if F is true, AND gate 418 and OR gate 419 pass the value of bit 1 of the TSR 305 to flip-flop 406. In other words, bit 2 of the TSR 305 will contain the value of bit 1 during the previous fetch operation.

In FIG. 4, the memory controller 129 is coupled to the instruction fetch logic 104 via various signal lines. Although not shown in FIG. 4, the signal lines between the memory controller 129 and instruction fetch logic 104 would normally be part of the system bus 102 of the microcomputer system 101.

The illustrative memory controller 129 of FIG. 4 has a memory address register 420 and memory buffer register 421. Bus CIA is set to the address of the next word in the program memory 107 which should be stored in the instruction register 301. When signal line LMAR is true, the memory controller 129 latches the contents of bus CIA in the memory address register 420. Signal line R, when true, specifies that it is desired to read the word specified on bus CIA from the program memory 107. Signal bus MBR transfers the contents of the memory buffer register 421 from the memory controller 129 to the instruction fetch logic 104. Signal line MRC is generated by the memory controller 129 and is true when the memory buffer register 421 contains the word from the program memory 107 specified by the address stored in the memory address register 420. Although not shown in FIG. 4, the interface between the memory controller 129 and instruction fetch logic 104 is typically via the system bus 102. Bus MBR in the embodiment of FIG. 4 transfers in parallel 16 bits, i.e. two bytes or one word, of data.

An instruction address register 422 contains the address in the program memory 107 for the next portion of the program data to be fetched from the program memory 107. The output of the instruction address register 422 is provided via signal bus CIA to the memory controller 129. In addition, the output is passed to an adder 423. This adder 423 increments the value in the instruction address register 422 and provides it as the 0 input to multiplexer 424. When signal line F is true, inverter 425 causes multiplexer 424 to select its 0 input as input to the instruction address register 422. In this way, the value in the instruction address register 422 is incremented to provide for sequential access to program memory 107.

In the event that a transfer of control should be performed, the new value for the instruction address register 422 is provided on signal bus IA as the 1 input to mux 424. Inasmuch as no instruction bytes are being fetched during a forced setting of the instruction address register 422, signal line F will be false, causing mux 424 to select the 1 input as the input to instruction address register 422. This forced setting of the instruction address register 422 is initiated by setting signal line LIAR true. Signal bus IA and signal line LIAR may be controlled by the instruction processing logic 105, or by other circuit modules during for instance, system initialization or to initiate the processing of an interrupt.

Signal line 426, the output of OR gate 425, will be true if a fetch request has been made by the instruction processing logic 105 (i.e., signal line F is true) and either bit 0 or bit 1 of the translation state register 305 is true. In other words, signal line 426 will be true if the values of bit 0 and 1 of the TSR 305 are not as indicated in FIG. 3A, but rather are as indicated in either FIG. 3B or 3C. Signal line 426 will be true when the next in sequence portion of the program data must be read from the program memory 107. Accordingly, signal lines R and LMAR are coupled to signal line 426. In addition, signal line 426, when true, indicates that adder 423 should increment the value in the instruction address register 422. If either signal line LIAR or signal line 426 is true, OR gate 427 causes the instruction address register 422 to latch the output of mux 424 as the new value for the instruction address register 622.

As previously mentioned, signal line MRC is generated by the memory controller 129 when the memory buffer register 421 contains the requested word from the program memory 107. The output, signal line C1, of AND gate 428 is true after a read operation from the program memory 107 has been requested via signal line R and has been completed, as indicated by signal line MRC as being true.

The embodiment of the invention illustrated in FIG. 4 provides for the forced loading of the instruction register 301. To accomplish this, signal line FIRL is set true, and the desired value to be stored in the istruction register 301 is presented on signal bus IF to multiplexer 429. If a fetch operation is in progress, inverter 430 will cause mux 429 to present as input to the instruction register 301 the contents of signal bus MBR. On the other hand, if no fetch is in operation, and signal line FIRL is high, mux 429 will provide the contents of bus IF to the instruction register 301. The instruction register 301 will latch the contents of its input if OR gate 431 indicates that either signal line FIRL or C1 is high.

Signal line C2, the output of AND gate 432 will be true if signal line F is true, i.e., a fetch is in progress, and the output of OR gate 433 is true. The output of OR gate 433 will be true if either C1 is true, i.e., a read from the program memory 107 has been requested and completed, or the inverted output of OR gate 434 is true, i.e., bits 0 and 1 of the translation state register 305 are both 0. Intuitively, C2 will be true if the instruction register 301 contains the next instruction byte to be forwarded to the instruction processing logic 105. The high byte portion 301H of the instruction register 301 is provided as the 0 input to mux 302; the low byte portion 301L is provided as the 1 input to the mux 302. Inputs 2 and 3 of the mux 302 are set by signal bus IBF. Signal bus IBF is used in conjunction with signal line FIBR to force a load of the instruction byte register 304. This may be desired by various other portions of the circuitry of the processor 103 in order to force a certain instruction to be executed next by the instruction processing logic 105.

Mux 302 will forward one of its four inputs to the instruction byte register 304 in accordance with the control signals received on its selection 0 and 1 inputs. Selection input 0 is determined by the output of AND gate 435. It will be true only if a fetch is in progress (F true) and TSR1 is true. In other words, if signal line F is true the value of bit 1 of the TSR 305 determines whether the value in the high byte portion 301H or low byte portion 301L of the instruction register 301 will be forwarded by the mux 302 to the instruction byte register 304. If signal line F is false, inverter 436 causes the contents of signal bus IBF to be provided by mux 302 to the instruction byte register 304.

The instruction byte register 304 is latched by the output of OR gate 438, i.e., if signal line FIBR is true, indicating that the value of the instruction byte register 304 is being forced, or if the output, signal line C3, of AND gate 437 is true. Signal line C3 will be true during phase 3 of the system clock cycle (CK3 true) when C2 is true. As previously mentioned, signal line C3 is used to clock the flip-flops 406 . . . 408 which form TSR 305. C3 will be true during phase 3 of the system clock cycle if the instruction register 301 contains the appropriate byte from the program to be transferred to the instruction byte register 304. The output of the instruction byte register 304 is provided via signal bus NIB as part of the bus 120 to the instruction processing logic 105.

Signal line C4, the output of AND gate 439 will be true during phase 4 of the system clock cycle when C2 is true. Signal line C4 is provided to the instruction processing logic 105 to indicate that the fetch of the next instruction byte has been completed and that the contents of bus NIB contain the appropriate next portion of the program data.

FIG. 5 is an illustrative computer flow chart of the embodiment of the instruction fetch logic 104 shown in FIG. 4, as it interacts with other portions of the processor 103. After power is provided the computer system (510), system initialization (502) is performed. The processor 103 must insure that a program is in the program memory 107 for execution, initialize various registers including the instruction address register 422 and TSR 305. After these housekeeping tasks have been performed, the processor 103 must determine if any interrupts are pending (503). If an interrupt is pending, a transfer of control instruction is performed (520). To accomplish this, the interrupt logic 110 sets the instruction address register 422 and TSR 305 to cause the first word of the appropriate interrupt program to be next fetched by the instruction fetch logic 104.

After this has been performed, or if no interrupt is pending, the instruction processing logic 105 is ready to process the next portion of the program. The instruction processing logic 105 therefore generates a fetch request to the instruction fetch logic 104 (521). The instruction fetch logic 104 inspects the value of bit 1 of the TSR 305 (504). If it is a 1, the contents of the instruction address register 422 are transferred via bus CIA to the memory controller 129 and a read of the addressed memory word is requested via signal line R. After the addressed portion of the program data is transferred to the instruction register 301, the low byte 301L of the instruction register 301 is then transferred to the instruction byte register 304 and made available to the instruction processing logic 105 (506). The TSR 305 is then set as indicated in block 507.

If the instruction processing logic 105 determines that a transfer of control instruction is being performed (509), it will set the instruction address register 422 and TSR 305 appropriately to cause the desired byte in the program to be supplied by the instruction fetch logic 104 to the instruction processing logic 105 when it generates its next fetch reqeust. If the instruction being executed does not transfer control to another portion of the program, or after the instruction address register and TSR have been set appropriately to cause the desired transfer of control, the interrupt logic 110 determines once again if an interrupt is pending (502).

Returning to decision block 504, if bit 1 of the TSR 305 is 0, bit 0 is tested (511). Only if bit 0 is 1 will the instruction fetch logic 104 request the appropriate next instruction word from the program memory 107 (512). As indicated in block 513, the high byte 301H of the instruction register 301 is then transferred to the instruction byte register 304 and to the instruction processing logic 105. The TSR 305 is then set as indicated in process block 514. In this manner, successive fetch requests generated by the instruction processing logic 105 result in the supplying by the instruction fetch logic 104 to it of consecutive byte portions of the program. The inventive instruction fetch logic 104 maintains all information necessary to sequentially transfer the program bytes to the instruction processing logic 104. The instruction fetch logic 105 is unaware of the division of the program into separate instruction. Yet, by generating the appropriate number of fetch request, the instruction processing logic 104 may obtain via its one byte width bus 120 instructions of arbitrary length, irrespective of the manner in which the instructions were stored in the program memory 107 or the width of the system bus 102 used to transfer the instructions to the instruction fetch logic 104.

Although certain embodiments of the invention have been discussed, it will be readily apparent to persons skilled in the art that certain changes and modifications can be made without departing from the spirit of the invention. For instance, the inventive instruction fetch logic of FIG. 4 may be readily extended to buffer any arbitrary width system bus 102 to instruction processor logic which has a bus 120 of any other arbitrary width. Specifically, if the system bus width is a multiple of the bus width between the instruction fetch logic and instruction process logic, the instruction register may be partitioned into multiple subregisters, whose contents may be selectively forwarded via a multiplexer under control of fetch control logic to the instruction processing logic. Accordingly, the foregoing disclosure, description, and figures are for illustrative purposes only, and do not in any way limit the invention, which is defined only by the claims.

What is claimed is:

1. In a computer system executing a Pascal P-Code program, where P-Code includes instructions of 1, 2, 3 and 4 bytes in length, the system including a memory storing the program as a sequence of two byte words irrespective of the length of each individual instruction, a processing subsystem comprising:

instruction processing logic means for generating a fetch request signal to obtain the next byte of an instruction in the program sequence and, upon receiving the first byte of a P-Code instruction, for generating 0, 1, 2, or 3 additional fetch requests as required to obtain the remaining bytes of the entire instruction;

an instruction register for storing a two byte word retrieved from memory;

a translation state register for storing a state code specifying the actions to be taken to obtain and transfer the next byte in the program sequence to the instruction processing logic means; and control logic means, responsive to a fetch request signal from the instruction processing logic means and responsive to the state code stored in the translation state register, (1) for retrieving from the memory the next word in sequence of the program and storing it in the instruction register if the state code specifies that the instruction register does not contain the next byte to be transferred to the instruction processing logic means, (2) for transferring from the instruction register to the instruction processing logic the next byte in the program sequence as specified by the state code, and (3) for setting the state code to specify the actions to be taken upon receiving the next fetch request, the processing subsystem, thereby accomplishing program instruction fetch control independently of the number of bytes in each instruction.

2. A processing system according to claim 1 wherein the instruction register is partitioned into a high byte subregister and a low byte subregister, and wherein the translation state register stores as at least part of the state code first and second status flags, the control logic means being responsive to the first and second status flags which in combination specify which one of the following three actions should be taken by the processing subsystem to transfer the next byte in the program sequence from the instruction register to the instruction processing logic means:

a. The contents of the high byte subregister should be transferred to the instruction processing logic means, b. The next word in program sequence should be retrieved from the memory and stored in the instruction register, and the updated contents of the high byte subregister should be transferred to the instruction processing logic means, or c. The next word in program sequence should be retrieved from the memory and stored in the instruction register, and the updated contents of the low byte subregister should be transferred to the instruction processing logic means.

3. A processing system according to claim 2, wherein the first status flag specifies whether the high or low byte subregister contents will next be transferred to the instruction processing logic means.

4. A processing system according to claim 1 further comprising:

an address register for storing the address in the memory of the program word last transferred to the instruction register; and an adder for incrementing the address stored in the address register upon receiving an increment signal;

wherein the control logic means further has means for generating said increment signal and for providing the resulting contents of the address register to the memory where the contents represent the address of the next program word in the memory.

5. A processing subsystem according to claim 2, wherein the control means includes state control logic means for setting the state code in the translation state register in preparation for the next fetch request after a program byte has been transferred to the instruction processing logic means as follows:

a. to transfer next the contents of the opposite subregister from that containing the program byte which had been just transferred; and b. if the contents of the high byte subregister had just been transferred, to retrieve from the memory the next program word and to store it in the instruction register before transferring any of the instruction register contents to the instruction processing logic means.

6. In a computer system which includes bus means for parallel transfer of data words of two bytes between modules coupled to it, memory means coupled to the bus means for retrieval of a program word specified by an address, and instruction processing logic means for generating a fetch request signal requesting a program byte for execution, an instruction fetch logic comprising:

an instruction register coupled to the bus means for holding a program word retrieved from the memory means;

an address register coupled to the bus means for storing the address of the program word being retrieved from the memory means for the instruction register;

a multiplexer coupled to the instruction register and responsive to a selection signal for providing the contents of a selected byte of the instruction register to the instruction processing logic means, in accordance with the selection signal;

a translation state register for storing information specifying which program byte being held in the instruction register should be transferred to the instruction processing logic means upon its next fetch request;

control logic including (1) means for inspecting the information in the translation state register upon receiving the fetch signal from the instruction processing logic means to determine the next program byte to be transferred to the instruction processing logic means, (2) means for altering the contents of the address register to correspond to the address in the memory means of the program word containing the byte to be next transferred to the instruction processing logic means, and supplying via the bus means the address register contents to the memory means to cause retrieval of the addressed program word, and transferring the retrieved program word to the instruction register, (3) means responsive to the translation state register for generating the selection signal to the multiplexer to select for transfer to the instruction processing logic means the program byte in the instruction register specified by the translation state register, and (4) means responsive to the instruction processing logic means and the previous information stored in the translation state register for setting the contents of the translation state register to specify the next program byte to be transferred to the instruction processing logic means, thereby providing a sequence of successively different bytes of the program to the instruction processing logic means upon successive fetch signals from the instruction processing logic means.

7. In a computer system executing a Pascal P-Code program, where P-Code includes instructions of 1, 2, 3 and 4 bytes in length, the system including a memory storing the program as a sequence of two byte words, and instruction processing logic which directs execution by said system of said instructions, a processing subsystem wherein:

said instruction processing logic comprises means for generating a fetch request signal to obtain the first byte of an instruction in said program sequence and, upon obtaining said first byte, for generating 0, 1, 2, or 3 additional fetch request signals as required to obtain the entire P-Code instruction;

an instruction register for storing a two byte word retrieved from memory;

translation state register means for storing a state code value which selectively directs (1) the retrieval of a word from said memory to be entered into said instruction register and (2) the supply of a certain byte from the word in said instruction register to said information processing logic; and control logic means, cooperating with said translation state register, instruction register and memory and responsive to receipt of a fetch request signal from said instruction processing logic, (1) for performing the next operation specified by the current state code value and (2) for setting the state code to a new value which will cause the next programmatically sequential instruction byte to be supplied to said instruction processing logic in response to the next received fetch request.

8. A processing subsystem according to claim 7 further comprising:

instruction address register means for specifying the address of the next two-byte word to be retrieved from said memory, said control logic means incrementing said specified address in response to performance of operations specified by certain state code values;

said instruction processing logic further including means for recognizing certain instructions as designating a transfer of control, and in response thereto, for correspondingly revising the contents of said instruction address register means and modifying said state code value so that upon the occurrence of the next fetch request, the word having the address now specified by said instruction address register means will be retrieved and entered into said instruction register for byte supply to said information processing logic.

9. In a computer system including memory means for storing program data and for transferring in parallel m-bit portions of program data specified by an address signal upon receiving a read signal, and an instruction processor which generates a fetch signal in response to which n-bit portions of the program data are transferred to the processor in parallel and where n is less than m, a fetch logic comprising:

address storage means for storing a program address specifying the next in program sequence m-bit portion of the program data and providing the program address as the address signal to the memory means;

instruction register means for storing in selected register locations, the m-bit portions of the program data transferred by the memory means, and, upon receiving an output control signal specifying certain of its register locations containing an n-bit portion, transferring in parallel the n-bit contents of the specified register locations to the instruction processor;

state register means for storing information specifying which, if any, of the instruction register means' locations contain the n-bit program portion to be next transferred to the instruction processor; and control means, coupled to the state register means, instruction register means, and address storage means, for (1) inspecting, upon receiving the fetch signal from the instruction processor, the state register means to determine the instruction register means' locations storing the next n-bit portion of the program data to be transferred to the instruction processor, (2) generating the read signal to the memory means if the state register means' information indicates the instruction register means does not contain the next n-bit program data portion, to cause the memory means to transfer to the instruction register means the next in sequence m-bit program data portion, and (3) generating the output control signal to the instruction register means to cause the transfer in parallel to the instruction processor of the next in sequence n-bit program data portion.

10. Fetch logic according to claim 9 wherein the instruction register means includes:

a holding register, storing kn bits of the program data, and partitioned into a sequence of k subregisters, each storing n bits of the program data; and an output multiplexer, coupled to the k subregisters and responsive to the output control signal, for gating the contents of a particular subregister to the instruction processor.

11. Fetch logic according to claim 10 wherein $m = kn$, and wherein the instruction register means further comprises:

an input multiplexer having plural m-bit inputs, including a first m-bit input coupled to the memory means and a second m-bit input for forced loaded instructions, the input multiplexer transferring the m-bit contents of one of its m-bit inputs to the holding register, said input multiplexer being responsive to said fetch signal to transfer the m-bit contents of the first input when the fetch signal is present.

12. Fetch logic according to claim 10 wherein the instruction register means further comprises:

a buffer register, for coupled to the output of the output multiplexer and to the instruction register, storing the contents of the designated subregister for access by the instruction processor.

13. Fetch logic according to claim 9, wherein the address storage means accepts an increment signal to advance the program address to the next consecutive m-bit portion of program; and wherein the control means generates the increment signal when it generates the read signal.

14. Fetch logic according to claim 13 wherein the address storage means further comprises:

an address register storing the program address; and an adder, coupled to the address register, which increments the contents of the address register upon receiving the increment signal, thereby advancing the program address to the next in sequence m-bit program data portion.

* * * * *